United States Patent
Pottier et al.

(10) Patent No.: US 9,079,533 B2
(45) Date of Patent: Jul. 14, 2015

(54) PROGRAMMABLE DEVICES FOR ALERTING VEHICLES AND PEDESTRIANS AND METHODS OF USING THE SAME

(71) Applicants: Peter Pottier, Brooklyn, NY (US); Valentin Siderskiy, Brooklyn, NY (US)

(72) Inventors: Peter Pottier, Brooklyn, NY (US); Valentin Siderskiy, Brooklyn, NY (US)

( * ) Notice: Subject to any disclaimer, the term of this patent is extended or adjusted under 35 U.S.C. 154(b) by 0 days.

(21) Appl. No.: 14/192,837

(22) Filed: Feb. 27, 2014

(65) Prior Publication Data
US 2014/0240113 A1 Aug. 28, 2014

Related U.S. Application Data

(60) Provisional application No. 61/769,902, filed on Feb. 27, 2013.

(51) Int. Cl.
*B60Q 1/26* (2006.01)
*B62J 6/00* (2006.01)
*B62J 3/00* (2006.01)
*B62J 6/02* (2006.01)
*B62J 99/00* (2009.01)

(52) U.S. Cl.
CPC ... *B60Q 1/26* (2013.01); *B62J 3/00* (2013.01); *B62J 6/001* (2013.01); *B62J 6/02* (2013.01); *B62J 2099/0006* (2013.01); *B62J 2099/008* (2013.01)

(58) Field of Classification Search
CPC .............. B60Q 1/00; B60Q 1/26; B62J 6/00; B62J 6/001; B62J 6/02; B62J 3/00
USPC ......... 340/432, 427, 425.5, 474, 692; 362/72, 362/285, 418, 431, 253, 473
See application file for complete search history.

(56) References Cited

U.S. PATENT DOCUMENTS

| | | | | |
|---|---|---|---|---|
| 4,099,159 | A | * | 7/1978 | Windisch ...................... 340/432 |
| 5,262,757 | A | | 11/1993 | Hansen |
| 5,418,696 | A | * | 5/1995 | Izzo, Sr. ....................... 362/473 |
| 5,737,247 | A | | 4/1998 | Baer |

(Continued)

OTHER PUBLICATIONS

ORP, 2012.

(Continued)

*Primary Examiner* — Hung T Nguyen
(74) *Attorney, Agent, or Firm* — Brooklyn Law IP Clinic; Serge Krimnus; David Arsego

(57) ABSTRACT

Programmable devices and associated methods for alerting pedestrians and vehicle operators are provided. In accordance with various embodiments of the disclosed subject matter, programmable devices for alerting pedestrians and vehicle operators are provided, the programmable device for alerting pedestrians and vehicle operators comprising: a housing having an attachment mechanism and an actuator disposed thereon, the attachment configured for engagement with a portion of a bicycle on a location proximate to at least one hand of a user while the user is in a riding position on the bicycle; a data input component disposed along the housing and configured to receive at least one audio file; a speaker in electrical communication with the data input and operably coupled with the actuator, the speaker configured to produce sound corresponding to the at least one audio file upon engagement of the actuator by the user; and at least one light source operably coupled with the actuator, the at least one light source configured to produce at least one lighting projection configuration upon engagement of the actuator by the user.

28 Claims, 3 Drawing Sheets

(56) References Cited

U.S. PATENT DOCUMENTS

| | | |
|---|---|---|
| 5,764,763 A | 6/1998 | Jensen |
| 6,230,140 B1 | 5/2001 | Severson |
| 6,317,036 B1 | 11/2001 | Popat |
| 7,095,336 B2 | 8/2006 | Rodgers |
| 7,106,180 B1 | 9/2006 | Pompei |
| 7,317,386 B2 | 1/2008 | Lengning |
| 7,379,541 B2 | 5/2008 | Iggulden |
| 7,495,549 B2 | 2/2009 | Acres |
| 7,812,740 B2 | 10/2010 | Mergen |
| 7,976,048 B2 | 7/2011 | Bartolome Garcia |
| 8,100,736 B2 | 1/2012 | Iida |
| 8,253,589 B2 | 8/2012 | Grimm |
| 8,277,097 B1 | 10/2012 | Gonzalez |
| 8,493,194 B1 | 7/2013 | Shoolman |
| 2010/0194130 A1* | 8/2010 | Bartolome Garcia et al. ............ 296/1.07 |
| 2014/0043151 A1* | 2/2014 | Lin ............... 340/432 |

OTHER PUBLICATIONS

Boingboing, Mark Frauenfelder, Car Horn for your Bike, Dec. 15, 2012.

* cited by examiner

PROGRAMMABLE DEVICES FOR ALERTING VEHICLES AND PEDESTRIANS AND METHODS OF USING THE SAME

CROSS REFERENCE TO RELATED APPLICATION

This application claims the benefit of and priority to U.S. Provisional Patent Application No. 61/769,902, filed on Feb. 27, 2013, the entire contents of which are incorporated by reference herein.

TECHNICAL FIELD

Programmable devices and associated methods for alerting vehicle operators and pedestrians are provided. In embodiments, the disclosed subject matter relates to programmable devices and associated methods for alerting vehicle operators and pedestrians to the presence of vehicles that are not traditionally equipped with electronic communication systems.

BACKGROUND

During the course of everyday travel, pedestrians or persons travelling by way of relatively small vehicles, such as bicycles and scooters, to name a few, may not be equipped with electronic communication systems, such as electronic horns and/or lights, that are frequently used by larger vehicles such as cars, trucks, and the like. Consequently, challenges may be presented to pedestrians or to persons operating these small vehicles in effectively communicating with operators of nearby vehicles or pedestrians, for example, to avoid collisions and/or otherwise communicate information to such persons.

Additionally or alternatively, the popularity of personal media players and vehicle-equipped audio systems has provided challenges in communication between pedestrians and/or operators of small vehicles and nearby pedestrians and/or vehicles due to such sound-generating devices "drowning out" other sounds. Some devices, such as noise-cancelling headphones, are designed to block and inhibit external sounds from reaching a user's ear. Similarly, vehicle audio systems frequently come equipped with powerful amplifiers and high quality speakers such that the vehicle's audio system can produce sound that is loud enough to effectively inhibit external sounds from reaching the occupants of the vehicle.

Furthermore, the communication devices presently available typically do not create any unusual or distinctive sounds, and as a result, can blend in with background noise. Additionally or alternatively, the sound produced by these devices may not be sufficiently loud in order to be recognized over other various noises that can bombard a nearby pedestrians and/or operators of other vehicles. For example, the volume of city traffic has been measured at levels as high as 70 decibels.

Accordingly, it would be desirable to provide a device for communicating with nearby pedestrians and/or operators of other vehicles that can effectively be recognized by such persons amongst the presence of other background sounds. It would further be desirable to produce such devices that are programmable so that distinctive and/or desirable sounds can be generated therefrom.

SUMMARY

In accordance with various embodiments of the disclosed subject matter, programmable devices and associated methods for alerting pedestrians and/or vehicle operators are provided.

In accordance with various embodiments of the disclosed subject matter, programmable devices for alerting pedestrians and/or vehicle operators are provided, the programmable device for alerting pedestrians and/or vehicle operators comprising: a housing having an attachment mechanism and an actuator disposed thereon, the attachment configured for engagement with a portion of a bicycle on a location proximate to at least one hand of a user while the user is in a riding position on the bicycle; a data input component disposed along the housing and configured to receive at least one audio file; a speaker in electrical communication with the data input and operably coupled with the actuator, the speaker configured to produce sound corresponding to the at least one audio file upon engagement of the actuator by the user; and at least one light source operably coupled with the actuator, the at least one light source configured to produce at least one lighting projection configuration upon engagement of the actuator by the user.

BRIEF DESCRIPTION OF THE DRAWINGS

Various features and characteristics of the disclosed subject matter will be further described herein with reference to the following drawings.

DETAILED DESCRIPTION

Figure 1:
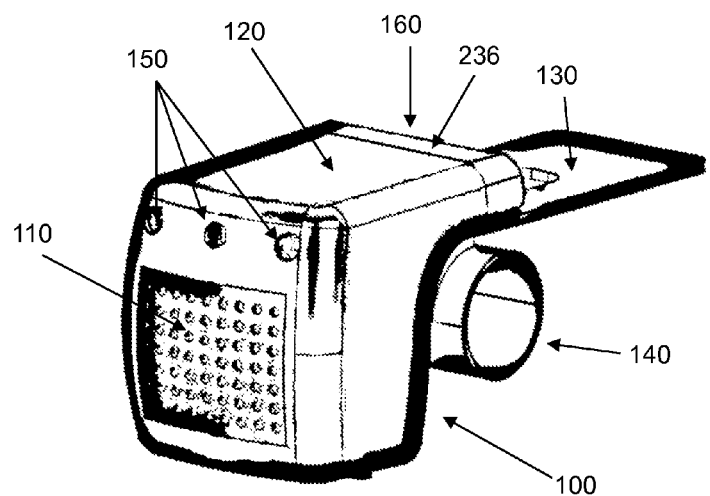
FIG. 1 is an isometric view of an example of a device for alerting vehicles and pedestrians in accordance with exemplary embodiments of the disclosed subject matter.

In accordance with exemplary embodiments of the disclosed subject matter, programmable devices and associated methods, for alerting pedestrians and/or the operators of nearby vehicles are provided.

As referred to herein, a lighting projection configuration refers to any configuration of the pattern, brightness, intensity, color, duration, and/or any other characteristic of the projection of a light.

As referred to herein, an audio file refers to any collection of data relating to the reproduction of a given sound, such as music, audio sounds, or recorded voice, to name a few. The audio file can be in any suitable digital audio protocol, such as .mp3, .mp4, .wma, .wav and/or any other suitable digital audio protocol.

As referred to herein, the term vehicle refers to any means of transportation, unless otherwise modified by other terms. For example, the term "small vehicle" refers to bicycles, scooters, mopeds and the like.

In exemplary embodiments, a user of the programmable devices described herein can select a digital audio file according to the user's preference, and transfer the audio file to a device capable of producing audible sounds corresponding to the audio file while the user is travelling as a pedestrian or as the operator of a relatively small vehicle, to alert nearby pedestrians and/or other vehicles to the user's presence.

For example, a user may have audio files stored on a personal computing device (e.g. a laptop computer or a cellular phone) and can transfer one or more of the audio files to a programmable device capable of sounding the one or more audio files while the user is operating a relatively small vehicle, in order to alert someone to the user's presence. The device may also be capable of projecting lights in a user-selectable configuration to further the alert. The programmable device may comprise a speaker, a group of light sources (such as Light Emitting Diode (LED) lights, neon lights, incandescent light bulbs, or the like), a data input component (such as a Universal Serial Bus (USB) port or Bluetooth transceiver), an actuator (such as a mechanical button, a capacitive touch screen and/or any other device capable of receiving a user input), a data storage component (such as a memory chip, removable USB drive, flash drive, Secure Digital (SD) drive, EEPROM, or the like), and a processor. The programmable device can receive the audio file or files by way of the data input component, and store the audio file or files in the data storage component. When the user desires to alert a pedestrian or operator of a nearby vehicle to the user's presence, the user can activate the device with the actuator. The actuator can be configured to accept a plurality of user inputs, each input configured to cause the programmable device to sound one or more of the audio files, and/or one or more different lighting projection configurations, (such as variations in pattern, brightness, intensity, color, and/or duration, of the lighting to name a few). Upon receiving a user input corresponding to an audio file, the processor can cause the audio file to be sounded by means of the speaker. Upon receiving a user input corresponding to a lighting projection configuration, the processor can cause the lighting to be projected from the group of light sources.

In exemplary embodiments, such devices may be employed for use on a bicycle. In such embodiments, the operator of a bicycle may own one or more audio files suitable for alerting nearby persons to the user's presence. Thus, the user may select any number of audio files in his or her possession and transfer them to the device described herein. As described above, the device can receive the selected audio files, store the selected audio files, and associate each audio file with a specified user input, as received by the actuator. Thus, the user can engage the actuator to cause the device to sound an audio file through the speaker.

In exemplary embodiments, the device can allow the user to sound any of the stored audio files at the time that the user wishes to alert someone to the user's presence, allowing the user to select which of the stored audio files is most appropriate for the user's present situation. For example, the user can transfer a soft, pleasant sounding audio file as well as a loud, obnoxious sounding audio file to the device. The device can associate each of the audio files with a different user input, as received by the actuator. Thus, at the time the user desires to alert someone to the user's presence, the user can cause the quiet, pleasant sound by engaging the actuator in a certain manner, and cause the loud, obnoxious sound by engaging the actuator in another manner.

In a more particular example, the user can select the quiet, pleasant sound when street noise is relatively low in order to not cause an overly startling disturbance. Alternatively, the user can select the obnoxious sound when street noise is relatively high in order to ensure that it can be distinctly heard over the street noise and/or other sounds.

In exemplary embodiments the stored audio files can be music, spoken words, recordings and/or any other suitable form or combination of sound. For example, the user could desire to play music in certain instances. In other instances the user could choose a more unique or obnoxious sound than music to ensure their presence is known. In still other instances, the user could choose spoken words to give others specific information. For example, a cyclist riding a crowded path might choose spoken words that inform others of the cyclist's specific intentions. In a more particular example, a cyclist could choose a sound stating that the cyclist is approaching on the left, or turning to the right.

In exemplary embodiments, the stored audio files can be used in combination with, or separately from the lighting projection configurations. For example, an obnoxious or loud sound could be used in combination with an obnoxious lighting projection configuration, such as bright, quickly flashing lights. Also, a pleasant sound could be used in combination with dimmer, slowly flashing lights. Further, an audio voice that explains the cyclist is coming on the left could be combined with a lighting projection configuration that moves from right to left to show the direction that the cyclist plans on passing.

In exemplary embodiments, the devices described herein can allow a user to select from a plurality of lighting projection configurations in addition or alternatively to the audio files. For example, the devices may associate one lighting projection configuration with a specified user input, and associate another lighting projection configuration with a different user input. In embodiments, each user input can be associated with an audio file such that each user input is associated with one lighting projection configuration and one audio file in any separation or combination thereof. For example, the devices may associate one user input with a lighting projection configuration and an audio file, another user input with a different lighting projection configuration and a different audio file, and still another user input with solely an audio file.

In exemplary embodiments, a user can manipulate one or more lighting projection configurations utilizing an external computing and/or control device, for example, a mobile phone, laptop computer, tablet computer, and/or desktop computer, to name a few. The user may save the designated configuration or configurations into data, and transfer the data to the device as described herein, for example, for storage in the storage component. Upon receiving a user input, the device can then access the configuration data, and cause the light sources and/or speaker to be activated in accordance with the configuration data.

In exemplary embodiments, the device can produce sound at volumes at a level audible over traffic noise. For example, the device can produce sound between 70 decibels and 86 decibels.

Turning to FIG. 1, an example of a device 100 for alerting pedestrians in accordance with exemplary embodiments is shown, the example device having a housing 120, a plurality of light sources 150, an actuator 160, and an attachment mechanism 130.

In exemplary embodiments, housing 120 can consist of a plurality of pieces connected such that the device will be substantially enclosed. Further, in exemplary embodiments, one or more pieces of housing 120 can be configured such that the piece or pieces are penetrable by light and/or sound. For example, as shown in FIG. 1, housing 120 can connect to or comprise a front plate 110, the front plate having a plurality of holes configured to better allow sound to penetrate the housing. As another example, housing 120 can comprise a plurality of holes positioned such that light from the plurality of light sources 150 better penetrates the housing.

In exemplary embodiments, a user can operate device 100 by manipulating an actuator 160. The actuator can be any device suitable for communicating a user input to the device, such as a button, switch, trigger, lever, a capacitive touch screen, motion sensor or voice activated device. For example, as shown in FIG. 1, the actuator can be a button configured to communicate a signal to the device 100 in response to a user depressing the button. As another example, the user input could be a capacitive touch screen. In such an example, the touch screen can be configured to activate certain features of the device 100 corresponding to where the user touches the screen.

Figure 2:
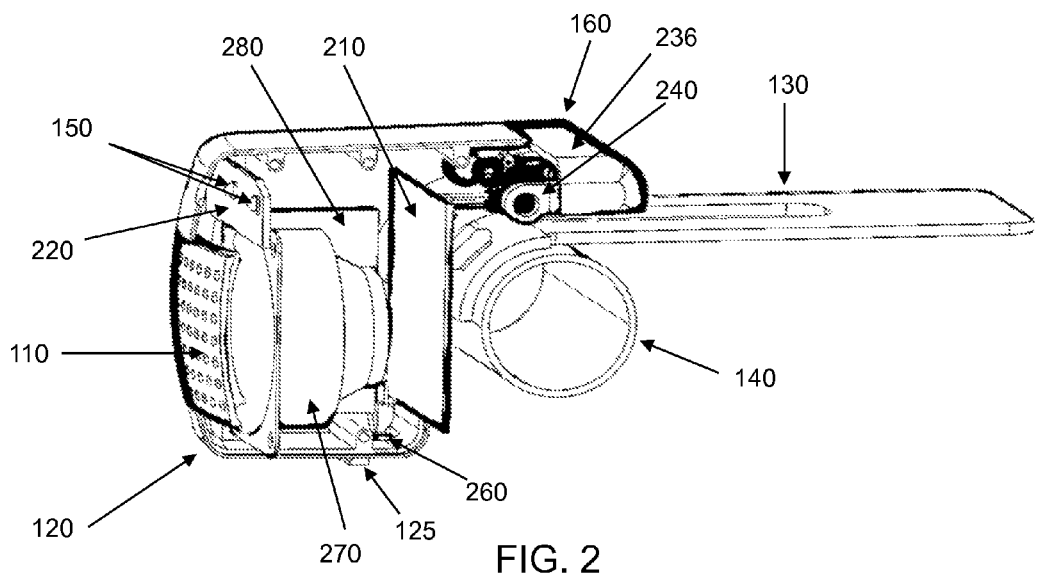
FIG. 2 is an internal view of the device in FIG. 2.
Figure 3:
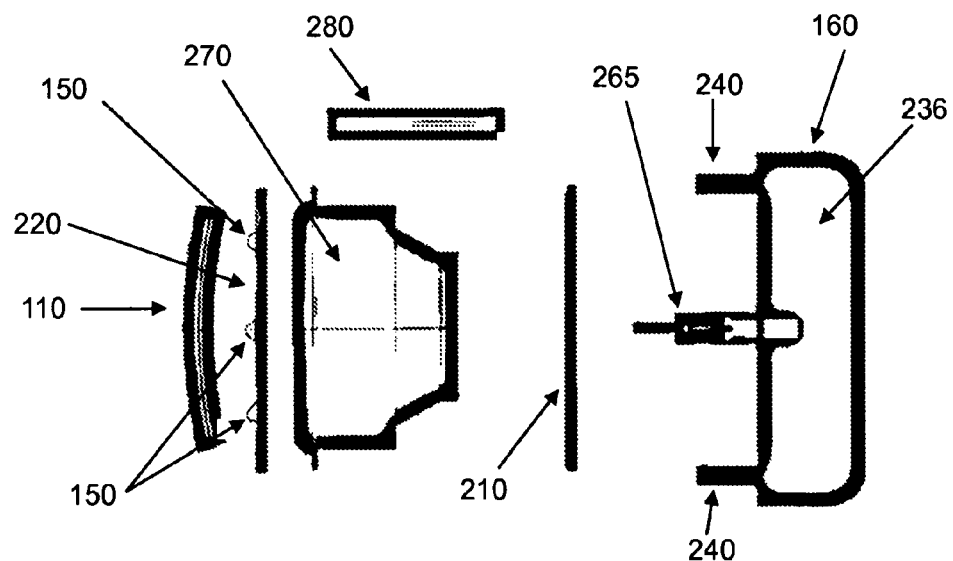
FIG. 3 is a disassembled partial view of the device in FIG. 2.

Turning to FIGS. 2 and 3, a cross sectional view and an exploded view, respectively, of the example device in FIG. 1 is shown, the example device comprising each component shown in FIG. 1, and further comprising a circuit board 210, a lighting circuit board 220, a trigger hinge 240, a trigger 236, data input component 260, speaker 270, power source 280, and latch 125.

In exemplary embodiments of the disclosed subject matter, data input component 260 can be coupled to circuit board 210 such that the circuit board can receive data from the data input component. Circuit board 210 can be coupled to trigger sensor 265 such that the circuit board can receive a signal from the trigger sensor 265. Circuit board 210 can further be coupled to speaker 270 such that the circuit board can transmit an audio signal to the speaker. Circuit board 210 can further be coupled to a plurality of light sources 150, such that the circuit board can cause the light sources to be activated.

At data input component 260, device 100 can be configured to accept data relating to user-selected audio files and/or lighting projection configurations. Data input component 260 can be any device suitable for accepting data relating to audio files and/or lighting projection configurations, such as a Universal Serial Bus (USB) port and/or a wireless communication transceiver (e.g., a BLUETOOTH transceiver). For example, the data input component can be a USB port. In such an example, the USB port can accept data from any device capable of transferring data through a USB port. In a more particular example, a user may have audio files stored on a personal computer or laptop, and can connect the personal computer or laptop to the device at the USB port, and transmit the audio files through the USB port.

In exemplary embodiments, the data input component can be configured to communicate with other electronic devices. For example, the data input component can be a wireless communication transceiver, such as a BLUETOOTH transceiver. In such an example, the device can be configured to communicate with other devices capable of receiving and transmitting BLUETOOTH signals. In a more particular example, the device could connect to a mobile phone by means of the BLUETOOTH transceiver. In such an example, the device could be configured to receive audio files, lighting projection configurations, and/or any other suitable data from the mobile phone. In a still more particular example, the device could be configured to stream audio from the mobile phone. In such an example, the data input component could maintain a persistent communication with the mobile phone, receiving audio data over the persistent communication, and transmitting the audio data to the device such that speaker 270 would sound the audio data. The audio data can be any suitable type of audio data, such as voice navigation direction, music, radio, or a phone call.

At circuit board 210, device 100 can be configured to activate light sources 150 in various patterns, durations, colors, and/or intensities. This can be accomplished by any suitable method or mechanism. For example, the circuit board can receive data corresponding to various patterns, durations, colors, and/or intensities with which to activate light sources 150 through data input component 260 and store the data in a data storage component 235. The device 100 can then associate the data with a user input, such that, upon receiving a user input signal corresponding to the lighting data, the processor can access the lighting data from the memory, and cause the light sources to be activated in a manner based on the data.

In exemplary embodiments, circuit board 210 can be employed as any configuration of electrical wiring and/or circuitry suitable for delivering current. For example, circuit board 210 can be a printed circuit board or a collection of electrical wiring, to name a few.

In exemplary embodiments one or more circuit boards can be employed individually or in combination with each other to perform any of the functions described herein. For example, with continued reference to FIGS. 2 and 3, circuit board 210 can be coupled to a lighting circuit board 220, which can be coupled to light sources 150. In such an example, circuit board 210 can transmit a signal to lighting circuit board 220 such that lighting circuit board 220 can control the activation of the light sources.

At actuator 160, the device can convert a user input into a digital signal, readable by device 100. In exemplary embodiments, the actuator can be configured to manipulate, control or activate any feature and/or function of the programmable device. For example, the actuator can be configured to turn off the device, to cause the device to sound audio files, and/or to adjust the volume of the device, to activate a lighting projection configuration, to name a few.

In exemplary embodiments, the actuator can convert the user input into a digital signal by any suitable method, technique or mechanism. For example, as shown in FIGS. 2 and 3, the actuator can comprise a trigger 236 configured to rotate about a trigger hinge 240 such that a trigger sensor 265 can be activated when a user depresses the trigger. Upon activation from the trigger, the trigger sensor can transmit a signal to the device corresponding with various functions of the device, such that the various functions can be activated. For example, upon activation from the trigger, the trigger sensor can be configured to send a signal causing the device to sound an audio file through speaker 270 and/or activate light sources 150.

In exemplary embodiments, actuator 160 can be configured to accept a variety of user inputs such that each user input can activate a different function of the device. Any variation in user input suitable for activating a different function can be used. For example, the user input mechanism could consist of a plurality of buttons, with each button configured to activate a different feature of the device. As another example, with continued reference to FIGS. 2 and 3, trigger sensor 265 can be configured to transmit a certain signal when trigger 236 is depressed completely, and to transmit a different signal when trigger 236 is depressed partially. In such an example, the device can be configured to activate a certain feature when the trigger is depressed completely, and a different feature when the trigger is depressed partially. In a more particular example, the device can be configured to activate a low volume audio file when the trigger is partially depressed, and a high volume audio file when the trigger is completely depressed. In another more particular example, the user could engage the actuator for one period of time to activate one desired sound and/or lighting projection configuration and engage the actuator for a different period of time to activate another.

In exemplary embodiments, the programmable device can be configured to enter a variety of modes. The modes can be used to control the state of the device, or adjust features and/or functions of the device to better adapt to the present environment. For example, the programmable device can be configured to have an "off" mode in order to conserve power, modes for different times of the day in order to adjust the lighting projection configurations to the amount of light, and/or modes for different locations of use.

In exemplary embodiments, modes relating to the time of day allow the device to perform in an optimal way in different conditions, such as when the ambient lighting changes. For example, the user could put the device into night mode, which would keep a light on, allowing the user to see ahead, and also allows others to see the user. In day mode, the light could be activated only when the user is attempting to alert others. As another example, modes for different locations of use can allow the user to lower the volume in quiet areas (such as suburban streets) and increase the volume in loud areas (such as urban streets). Further modes can allow the user to change the function of any actuator input, including multiple user inputs. Therefore, modes increase the potential number of options the user can select.

In exemplary embodiments, the modes can be controlled, manipulated or implemented by one or more actuators.

In exemplary embodiments, a small number of actuator devices can produce a variety of functions. For example, a single actuator could control sound, lighting and modes. Some advantages of using a limited number of actuator devices are to reduce manufacturing cost and to preserve space on the device. Further, a small number of actuators allow each one to be relatively large, thus providing the user an easy target, while the user is engaged in operating the user's vehicle. In exemplary embodiments, a single actuator can be associated with a variety of functions in various ways, such as by programming the timing or the degree of inputs. For example, the device can be configured to switch modes or activate audio and lighting after the user engages the actuator for a specified period of time. In a more particular example, the device can switch to day mode after a constant engagement of two seconds, to night mode after a constant engagement of three seconds, and to off mode after a constant engagement of four seconds. In such an example, the user could alternatively activate a desired sound and/or lighting projection configuration by engaging the actuator for under a second. The user can further activate another sound and/or lighting projection configuration by varying the number of times that the actuator is engaged within a short period of time, such as by engaging the actuator once quickly to activate one configuration, and alternatively by engaging the actuator twice in succession to activate another configuration.

In exemplary embodiments, the device can comprise a plurality of actuators that can be used independently or in combination with each other. For example, the device can comprise an actuator configured to adjust the volume of the sounds produced by the device, as well as an actuator configured to activate the audio files. In a more particular example, one actuator can be a wheel, accessibly attached to the housing, and configured to increase the volume when turned in one direction or decrease the volume when turned in the opposite direction. The other actuator can be a capacitive touch screen, configured to activate one audio file when the user touches the screen in one area and a different audio file when the user touches the screen in a different area.

At speaker 270, audio files stored in data storage component 235 can be produced as sound. The speaker can be any device, or combination of devices, that produces sound in response to an electric current. In exemplary embodiments, the speaker can be a full range speaker, capable of producing sound at a wide range of frequencies, in order to reproduce a wide range of audio files. For example, the speaker can produce frequencies as high as 20,000 Hz, and as low as 20 Hz.

At power source 280, electrical power is supplied to the device. In exemplary embodiments, the power source can be coupled to circuit board 210 and/or any other component of the device. In exemplary embodiments, the power source can be any mechanism suitable for providing electrical power to the other components. For example, the power source can be a battery.

In exemplary embodiments, the power source can be charged utilizing data input component 260. For example, data input component 260 can be a USB port. In such an example, the power source can be coupled to the USB port such that when the USB port is connected to an electronic device, the power source can draw power from the electronic device, through the USB port, and into the power source such that the power source increases its charge.

At attachment mechanism 130, device 100 can be removably attached to any structure suitable for maintaining the device in an operable position. For example, as shown in FIG. 2, the device can be attached to a cylindrical structure 140, by fastening the cylindrical structure 140 to the device with attachment mechanism 130 and latch 125. In a more particular example, the cylindrical structure 140 could be the handlebars on a bicycle. In a still more particular example, attachment mechanism 130 can comprise a flexible member or strap. The member or strap can be irremovably attached to the rear side of the device, and configured to allow the flexible member or strap to partially or completely circle the cylindrical structure and removably attach to latch 125. The attachment mechanism can be configured to apply pressure to cylindrical structure such that the device is fastened in an operable position.

Figure 4:
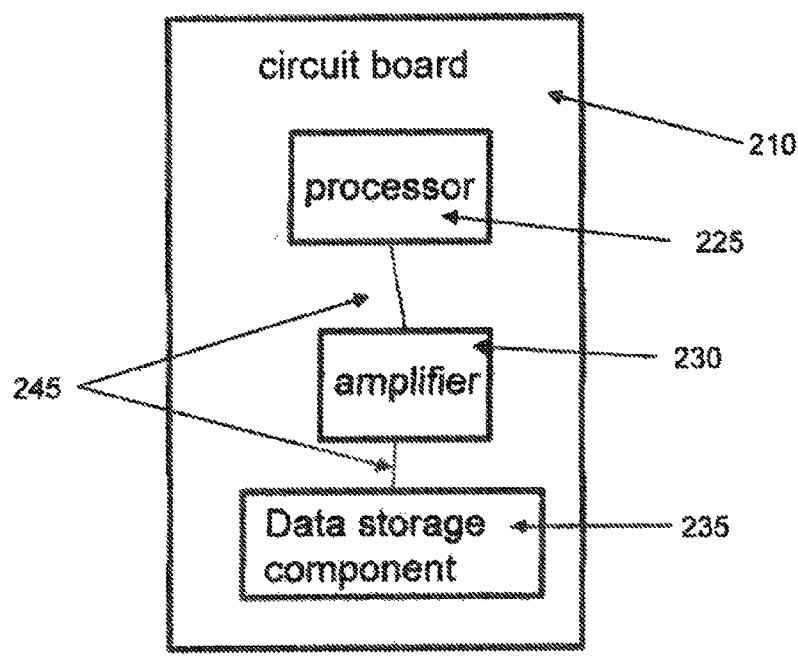
FIG. 4 is a top side view of the device in FIG. 2.

Turning to FIG. 4, a block diagram of an example of the circuit board 210 of device 100 is shown, the circuit board comprising a processor 225, an amplifier 230, a data storage component 235, and a plurality of electrical connections 245.

At processor 225, the device can control various aspects and features of the device. For example, the processor can be configured to receive a user input signal from trigger sensor 265. The processor can further be configured to access data stored in data storage component 235, and associate the stored data with the user input signals. The processor can further be configured to read the stored data, and cause speaker 270 and/or light sources 150 to be activated in accordance with the stored data. In a more particular example, the stored data can be an audio file, and the processor can associate the audio file with a certain user input signal. Upon receiving the certain user input signal, the processor can read the audio file, convert the audio file into an audio signal, and transmit the audio signal to the speaker such that the speaker sounds an audio file in accordance with the audio file.

At amplifier 230, the device can receive an audio signal from the processor, and amplify the signal such that the speaker can sound the audio signal at a certain volume. In exemplary embodiments, the amplifier can be coupled to the processor such that the processor can control the amount of amplification. For example, the processor can access data related to the volume of an audio signal from the data storage component, calculate the amount of amplification required to achieve the volume, and cause the amplifier to amplify the audio signal in accordance with the amount of amplification required.

In exemplary embodiments, the amplifier can be coupled to the actuator and configured to vary the amount of amplification in response to a user input from the actuator. For example, the amplifier can be configured to increase the amplification in response to a user engaging the actuator in a certain manner. In a more particular example, with continued reference to FIGS. 2 and 3, the user can depress trigger 236 twice in rapid succession, causing trigger sensor 265 to deliver a certain signal to the amplifier. In such a particular example, the amplifier can be configured to increase the amount of amplification by a certain amount in response to the certain signal.

At data storage component 235, the device can store audio files, data related to how the audio files are produced as sound, lighting projection configurations, and/or any other data useful for implementing the programmable devices described herein. In exemplary embodiments, data storage component 235 can be any device suitable for storing data, such as a memory chip, a removable USB drive, an SD drive, a flash drive, EEPROM, RAM, and/or any other device suitable for storing data related to audio files or lighting projection configurations.

In exemplary embodiments, the device can comprise one or more data storage components that can be utilized independently or in combination with one another. For example, a data storage component such as a removable USB flash memory can be inserted into the data input and utilized in combination with a memory chip located in the device. In a more particular example, the USB flash memory can contain additional audio files, and the device can be configured to access the additional audio files and sound the additional audio files upon receiving a certain user input.

In exemplary embodiments, data storage component 235 can store data related to the user's activity, such as the number of times that the user activates the device, the number of time the user engages the actuator, the number of times the user sounds each of the audio files, and/or any other data related to the user's activity.

At electrical connections 245, the data storage component, the processor, and the amplifier can be coupled to one another in order to transmit signals and/or data. In exemplary embodiments, any electrical connection can be used, such as electrical wiring, printed circuit boards, and/or any other connection suitable for transmitting signals and/or data. For example, the amplifier and processor can be coupled by attachment to a printed circuit board, and the processor can be coupled to the data storage component by means of electrical wiring attached to the printed circuit board and to the data storage component.

Figure 5:
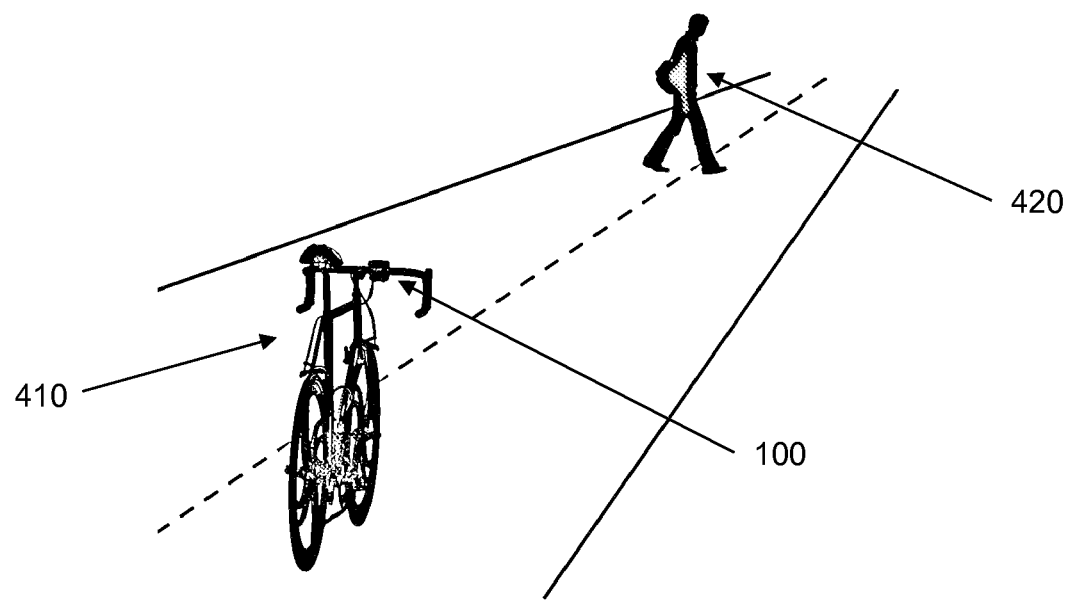
FIG. 5 is an illustration of an example of an implementation of the device in FIG. 2.

Turning to FIG. 5, an illustration of an example of an implementation of the device in FIG. 2, the device 100 can be located on the handlebar region of a bicycle 410. The handlebars can be an advantageous location for the device because it allows the user easy access to reach and see programmable device 100. Furthermore, the handlebar location provides enough height for the device's lights to be easily visible and the device's sound to effectively project. The direction of the device can face forward, in order for the maximum amount of sound and light to reach a pedestrian 420, or any other object in the path of the bicycle.

In an exemplary embodiment, device 100 can be located on a handlebar region proximate to the user's grip. For example, the device can be located, on the handlebar region, at a distance proximal to the user's thumb such that the device can be manipulated by the user's thumb while maintaining a grip on the handlebars.

In an exemplary embodiment, device 100 can be located at any location of a small vehicle suitable for allowing the device: to be accessed by the user; to project sound to pedestrians and/or vehicle operators; and/or to project light to pedestrians and/or vehicle operators.

It should be understood that the functions, mechanisms, and components as described herein with reference to FIGS. 1-5 can be implemented and/or executed in any sequence, combination, location, or implementation, and are not limited to the sequences, combinations, locations, implementations or manners illustrated in the figures or described above. It should be further understood that FIGS. 1-5 do not illustrate all of the embodiments of the disclosed subject matter.

In an exemplary embodiment, the programmable device can be configured to connect with external electronic devices such as a mobile phone or a navigation device. In an exemplary embodiment, the user could electronically couple (e.g., with a USB cable, or other suitable electronic coupling) their external electronic device to the programmable device and exchange data and battery power. This could allow the electronic device to be easily accessible and viewable by the user. Further, the user's data, such as an audio file, could travel directly into the programmable device, eliminating the need to upload files. Other types of data such as lighting projection configurations and navigational directions can also be transferred to the programmable device.

In an exemplary embodiment, the programmable device can be configured to wirelessly connect to an external electronic device, such as a smartphone or a navigation device, in order to transfer data between the two devices. For example, data and information such as audio files, lighting projection configurations and/or navigation directions could be wirelessly communicated to the programmable device.

In an exemplary embodiment, an external electronic device could be used as a user interface for the programmable device. For example, a smartphone, or other device, could be connected, either physically or wirelessly, to the programmable device and an application on the smartphone could provide an interface for the user. A user interface provided by an application from an external device provides a cost effective means of allowing the user a sophisticated user experience, such as the ability to easily communicate user input.

In an exemplary embodiment, the programmable device can be configured to adjust the lighting projection configuration in response to the character of a selected audio file. The lighting projection configuration can be adjusted by any characteristic of the audio file, such as the rhythm, volume, length, frequency and/or any other suitable audio characteristic. In a more particular example, upon receiving a user input associated with a stored audio file, the programmable device can analyze the associated audio file in order to determine the rhythm. The programmable device can then adjust the lighting projection configuration such that the light sources are activated in a pattern matching the rhythm.

In an exemplary embodiment, the programmable device can be configured to respond to the proximity of other devices or objects. For example, the device can comprise a proximity sensor, such as a sensor that emits an electromagnetic field, a sonar field, or an ultrasound field, to name a few, and detects variations in the field. Such a sensor can transmit a signal to the programmable device, such that, in response to the signal, the programmable device can activate, manipulate, and/or control any of the features and/or functions of the programmable device. In a more particular example, upon receiving a signal corresponding to an object within the proximity of the programmable device, the programmable device can sound one or more of the audio files stored in the data storage component. In another example, the data input component can be a wireless signal transceiver, such as a BLUETOOTH transceiver, a WiFi transceiver, and/or any other transceiver capable of wirelessly sending and receiving digital data. In such an example, the wireless signal transceiver can be configured to, upon sensing another compatible wireless signal transceiver within the proximity of the programmable device, send a signal to the programmable device. In response to such a signal, the programmable device can be configured to sound one or more of the audio files stored in the data storage component, activate the light sources, and/or activate, manipulate, or control any of the other features and/or functions of the programmable device.

Accordingly, programmable devices and associated methods for alerting vehicles and pedestrians have been provided.

It should be understood that the functions, mechanisms, and components as described herein can be implemented and/or executed in any sequence, combination, location, or implementation, and are not limited to the sequences, combinations, locations, implementations or manners illustrated in the figures or described above.

It should further be understood that although the programmable devices and associated methods for alerting vehicles and pedestrians have been provided and described above, this description has been offered only by way of example, and the scope of the present invention is limited only by the claims that follow.

What is claimed is:

1. A programmable device for alerting vehicles and pedestrians, comprising:
    a housing having an attachment mechanism and an actuator disposed thereon, the attachment configured for attachment to a handlebar;
    a data input component disposed along the housing and configured to receive at least one audio file, and, from a device capable of transferring data, configured to receive lighting projection configuration data;
    a speaker in electrical communication with the data input and operably coupled with the actuator, the speaker configured to produce sound corresponding to the at least one audio file upon engagement of the actuator by the user;
    and at least one light source operably coupled with the actuator, the at least one light source configured to produce at least one lighting projection configuration upon engagement of the actuator by the user.

2. The device of claim 1, wherein the at least one audio file is a user selected audio file.

3. The device of claim 1, further comprising an amplifier operably coupled with the speaker and configured to amplify at least one audio file.

4. The device of claim 1, wherein the actuator is configured to accept a plurality of user inputs, the user inputs each corresponding to at least one audio file or lighting projection configuration.

5. The device of claim 1, wherein the data input component is a wireless signal transceiver, the wireless signal transceiver configured to communicate with an external electronic device.

6. The device of claim 5, wherein the external electronic device is configured to accept at least one user input, the at least one user input corresponding at least to the at least one audio file.

7. The device of claim 5, wherein the external electronic device is configured to stream at least one audio file to the device.

8. The device of claim 1, wherein engagement of the actuator further changes the mode of the device, the mode corresponding to at least one lighting projection configuration.

9. The device of claim 1, wherein the lighting projection configuration is a user selected lighting projection configuration.

10. A method for alerting vehicles and pedestrians, comprising the steps of:
    selecting at least one audio file;
    transmitting the at least one audio file to a device capable of sounding the at least one audio file;
    causing the device to produce one or more sounds corresponding to the at least one audio file;
    selecting at least one lighting projection configuration data;
    transmitting the at least one lighting projection configuration data to a device capable of producing light corresponding to the at least one lighting projection configuration data;
    causing the device to produce light corresponding to the at least one lighting projection configuration data through at least one light source.

11. The method of claim 10, further comprising the step of: storing the at least one audio file in the device.

12. The method of claim 10, further comprising the step of: converting the at least one audio file to an analog audio signal; and amplifying the audio signal.

13. The method of claim 12, further comprising the step of: amplifying the analog audio signal such that the sound associated with the analog audio signal can be produced at a volume exceeding 70 decibels.

14. The method of claim 10, further comprising the step of: accepting a plurality of user inputs, the user inputs each corresponding to at least one audio file or lighting projection configuration.

15. The method of claim 10, further comprising the step of: configuring the device to wirelessly communicate with an external electronic device.

16. The method of claim 15, further comprising the step of configuring the external electronic device to accept at least one user input, the at least one user input corresponding at least to the at least one audio file.

17. The method of claim 15, further comprising the step of: configuring the external electronic device to stream at least one audio file to the device.

18. The method of claim 10, further comprising the step of: selecting a mode for the device, the mode corresponding to at least one lighting projection configuration.

19. The method of claim 10, further comprising the step of: selecting the lighting projection configuration.

20. The device of claim 1, wherein the data input component is configured to send a signal to a second programmable device in a proximity of the programmable device, wherein the second programmable device is configured to activate a feature in response to the signal.

21. The device of claim 1, wherein the lighting configuration data comprises at least one of a pattern, a brightness, an intensity, a color, and a duration.

22. The device of claim 1, wherein the lighting configuration data comprises a pattern, a brightness, an intensity, a color, and a duration.

23. The device of claim 1, wherein the lighting configuration data comprises a pattern.

24. The device of claim 1, wherein the lighting configuration data comprises a brightness.

25. The device of claim 1, wherein the lighting configuration data comprises an intensity.

26. The device of claim 1, wherein the lighting configuration data comprises a color.

27. The device of claim 1, wherein the lighting configuration data comprises a duration.

28. The device of claim 1, wherein the lighting configuration data is received from a Universal Serial Bus (USB) port or a wireless communication receiver.

* * * * *